(12) United States Patent
Gilbert (10) Patent No.: US 12,090,924 B2
(45) Date of Patent: Sep. 17, 2024

(54) CONVERSATION DETECTOR TO INSERT AUDIBLE ANNOUNCEMENTS

(71) Applicant: GM Cruise Holdings LLC, San Francisco, CA (US)

(72) Inventor: Brian Vaughn Gilbert, Fairfax, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 259 days.

(21) Appl. No.: 17/557,344

(22) Filed: Dec. 21, 2021

(65) Prior Publication Data

US 2023/0191992 A1 Jun. 22, 2023

(51) Int. Cl.
*B60Q 9/00* (2006.01)
*G10L 25/78* (2013.01)

(52) U.S. Cl.
CPC ............... *B60Q 9/00* (2013.01); *G10L 25/78* (2013.01)

(58) Field of Classification Search
CPC .. B60Q 9/00; G10L 25/78; G08B 3/10; H04R 27/00; H04R 2227/001; G06F 3/167
See application file for complete search history.

(56) References Cited

U.S. PATENT DOCUMENTS

| | | | | |
|---|---|---|---|---|
| 9,037,455 B1* | 5/2015 | Faaborg | ................. | G10L 21/00 704/251 |
| 10,106,080 B1* | 10/2018 | Hassani | ................. | B60N 2/242 |
| 2003/0139171 A1* | 7/2003 | Kuita | ..................... | H04M 1/57 455/410 |
| 2014/0005814 A1* | 1/2014 | Hwang | ................. | H04N 5/783 700/94 |
| 2015/0106087 A1* | 4/2015 | Newman | ................. | G10L 25/78 704/233 |
| 2015/0150046 A1* | 5/2015 | Maharajh | ............ | G06Q 30/0244 725/34 |
| 2020/0156659 A1* | 5/2020 | Shannon | ............ | G01C 21/3691 |
| 2020/0201598 A1* | 6/2020 | Topaloglu | ............... | G10L 15/07 |
| 2020/0357406 A1* | 11/2020 | York | ....................... | G10L 25/78 |
| 2022/0375318 A1* | 11/2022 | Trundle | ................. | G08B 13/00 |
| 2022/0413797 A1* | 12/2022 | Kallara Rajappan | ... | G06F 3/017 |

* cited by examiner

*Primary Examiner* — Bhavesh M Mehta
*Assistant Examiner* — Darioush Agahi (57) ABSTRACT

Systems and methods for detecting a convenient time to play an audible announcement. The techniques described herein can be implemented for audible announcements in various settings, including, for example, audible announcements in an autonomous vehicle and audible announcements from a mapping service on a mobile device. In an autonomous vehicle, interior microphones can be used to detect voices within the vehicle and identify pauses in conversation. Audible notifications and announcements within the autonomous vehicle can then be made during the pauses.

20 Claims, 7 Drawing Sheets

CONVERSATION DETECTOR TO INSERT AUDIBLE ANNOUNCEMENTS

FIELD OF THE DISCLOSURE

The present disclosure relates generally to autonomous vehicles (AVs) and to systems and methods for audible announcements.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Passengers may ride together with friends in autonomous vehicles, and they may ride in a ridehail vehicle with other passengers. In some instances, passengers may be engaged in conversation with others inside the autonomous vehicle, on a phone call with someone else, playing a video game on an in-vehicle entertainment system, reading a book, or otherwise engaged in a focused activity within the autonomous vehicle.

SUMMARY

Systems and methods are provided for detecting a convenient time to insert an audible announcement in an autonomous vehicle. In particular, using interior microphones, voices within the vehicle can be detected and pauses in conversation can be identified. Audible notifications and announcements within the autonomous vehicle can then be made during the pauses. In some examples, interior vehicle sensors can be used to determine when a passenger is engrossed in an activity and identify a moment for an audible announcement that is not disruptive to the passenger's activity.

According to one aspect, a method for playing an audible announcement comprises: monitoring voices in conversation, wherein monitoring voices includes detecting voice and speech sounds; identifying a pause in the conversation, wherein the pause includes a selected period of time with no detected voice sounds; and causing an audio device to output the audible announcement during the pause.

In some implementations, monitoring voices further comprises detecting sound in a select frequency band, wherein the select frequency band corresponds to voice and speech frequencies. In some implementations, monitoring voices further comprises detecting sound in a select frequency band, wherein the select frequency band corresponds to at least one of voice frequencies and speech frequencies. In some implementations, detecting sound in the select frequency band includes detecting sound having frequencies between 100 hertz and 2000 hertz. In some implementations, detecting sound in the select frequency band includes detecting sound having frequencies between 100 hertz and 5000 hertz. In some implementations, identifying the pause includes identifying about two seconds with no detected voice sounds. In some implementations, the method further comprises predicting the pause in the conversation based on detected voice and speech sounds.

In some implementations, monitoring voices includes monitoring voices using a microphone in an autonomous vehicle, and wherein causing the audio device to output the audible announcement includes playing the audible announcement on an autonomous vehicle speaker. In some implementations, monitoring voices includes monitoring voices using a mobile device microphone, and wherein causing the audio device to output the audible announcement includes playing the audible announcement on a mobile device speaker.

According to another aspect, a method for playing an audible announcement comprises accessing mobile device speaker output; monitoring mobile device output content; identifying a pause in the mobile device output content; and causing an audio device to output the audible announcement during the pause.

In some implementations, monitoring the mobile device output content includes monitoring one of a podcast, an audiobook, and music. In some implementations, identifying the pause includes identifying one of a podcast commercial break, an audiobook chapter break, a transition between programs, and a transition between songs. In some implementations, monitoring the mobile device output content includes monitoring a mobile device phone conversation, and wherein identifying the pause includes identifying a conversation pause. In some implementations, monitoring the mobile device output content further comprises detecting sound in a select frequency band, wherein the select frequency band corresponds to voice and speech frequencies. In some implementations, the method further comprises predicting the pause in the mobile device output content based on output content type and corresponding pause types.

According to another aspect, a system for playing an audible announcement, comprises: a microphone configured to monitor voices in conversation and detect voice and speech sounds; a processor configured to identify a pause in the conversation, wherein the pause includes a selected period of time with no detected voice sounds or speech sounds; and a speaker configured to play the audible announcement during the pause.

In some implementations, the microphone is further configured to detect sound in a select frequency band, wherein the select frequency band corresponds to voice and speech frequencies. In some implementations, the select frequency band includes frequencies between 100 hertz and 2000 hertz. In some implementations, the selected period of time for the pause is about two seconds. In some implementations, the processor is further configured to predict the pause in the conversation based on detected voice and speech sounds.

In some implementations, the system includes an autonomous vehicle, the microphone and speaker are inside an interior cabin of the autonomous vehicle and the processor is in an onboard computer in the autonomous vehicle; wherein the microphone is configured to monitor voices in the autonomous vehicle; and wherein the speaker is configured to play the audible announcement inside the autonomous vehicle. In some implementations, the system further comprises a mobile device, wherein the microphone, processor, and speaker are in the mobile device.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided for detecting a convenient time to insert an audible announcement. The techniques described herein can be implemented for audible announcements in various settings, including, for example, audible announcements from a mapping service on a mobile device and audible announcements in an autonomous vehicle. In particular, in an autonomous vehicle, interior microphones can be used to detect voices within the vehicle and identify pauses in conversation. Audible notifications and announcements within the autonomous vehicle can then be made during the pauses. In some examples, interior vehicle sensors can be used to determine when a passenger is engrossed in an activity and identify a moment for an audible announcement that is not disruptive to the passenger's activity.

In some examples, when a group of passengers are conversing, they may miss an audible notification that occurs during their conversation. Additionally, when passengers are engaged in conversation, the passengers may prefer not to have their conversation interrupted by audible announcements. Similarly, if a passenger is watching a show, listening to a podcast or audiobook, reading a book, or working, the passenger may prefer not to be interrupted with automated audible announcements.

Systems and methods are disclosed herein to identify pauses in passenger activity that are suitable for making audible announcements. For example, interior cabin microphones can be used to identify pauses in conversation between/among passengers. In some examples, a ridehail application on a mobile device can identify pauses in a podcast (e.g., a commercial break) or show played through the mobile device, or pauses in a phone conversation on the mobile device. In other examples, other vehicle sensors can detect if a passenger who is reading shifts their gaze from their reading material, e.g., to look out the window.

In further examples, the systems and methods disclosed herein can be used for audible announcements in other settings. In some examples, the systems and methods can be used by a navigation system on a mobile device that is providing directions to a driver. The navigation system can time audible announcements to coincide with pauses in passenger conversation or pauses in a phone conversation occurring via the mobile device. Similarly, the navigation system can time audible announcements to minimize interruptions to podcast, audiobook, music track, or other mobile device output.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Passenger Conversation Monitoring

Figure 1A:
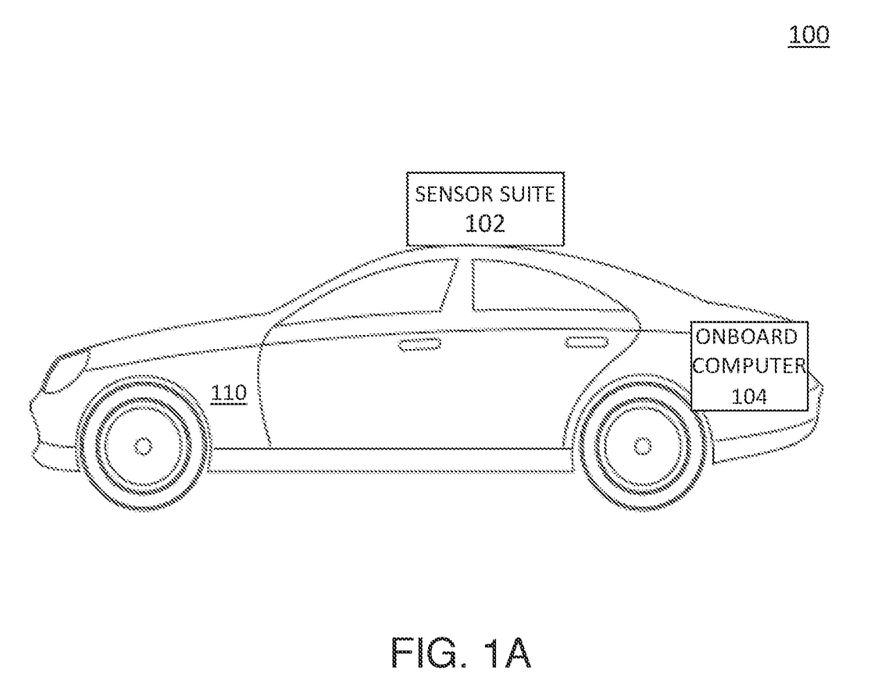
FIGS. 1A-1C are diagrams illustrating an autonomous vehicle, according to some embodiments of the disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured to monitor passenger conversations and identify pauses for audible announcements.

The sensor suite 102 includes localization and driving sensors. For example, the sensor suite may include one or more of photodetectors, cameras, radio detection and ranging (RADAR), SONAR, light detection and ranging (LIDAR), GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. Additionally, sensor suite 102 data can provide localized traffic information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

In some implementations, data from the sensor suite 102 can be used to detect a passenger exiting a vehicle and/or to determine that a passenger has exited a vehicle. In some examples, the sensor suite 102 can be used to track initial movements of the passenger after the passenger exits the vehicle. In some examples, a passenger drop-off determination is satisfied by detecting that a passenger has exited the vehicle. For instance, interior and/or exterior cameras can be used to detect that a passenger has exited the vehicle. In some examples, other interior and/or exterior sensors can be used to detect that a passenger has exited the vehicle.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the interior sensors include microphones that can be used to monitor passenger conversations inside the vehicle and identify pauses suitable for playing audible announcements. In some examples, the autonomous vehicle 110 includes one or more cameras inside the vehicle. The cameras can be used to detect items or people inside the vehicle. In some examples, the cameras can be used to identify passenger activity inside the vehicle and identify activity pauses that provide an opportunity for audible announcements. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences. In some examples, passengers can also provide feedback regarding the frequency and type of audible announcements inside the vehicle.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 1B:
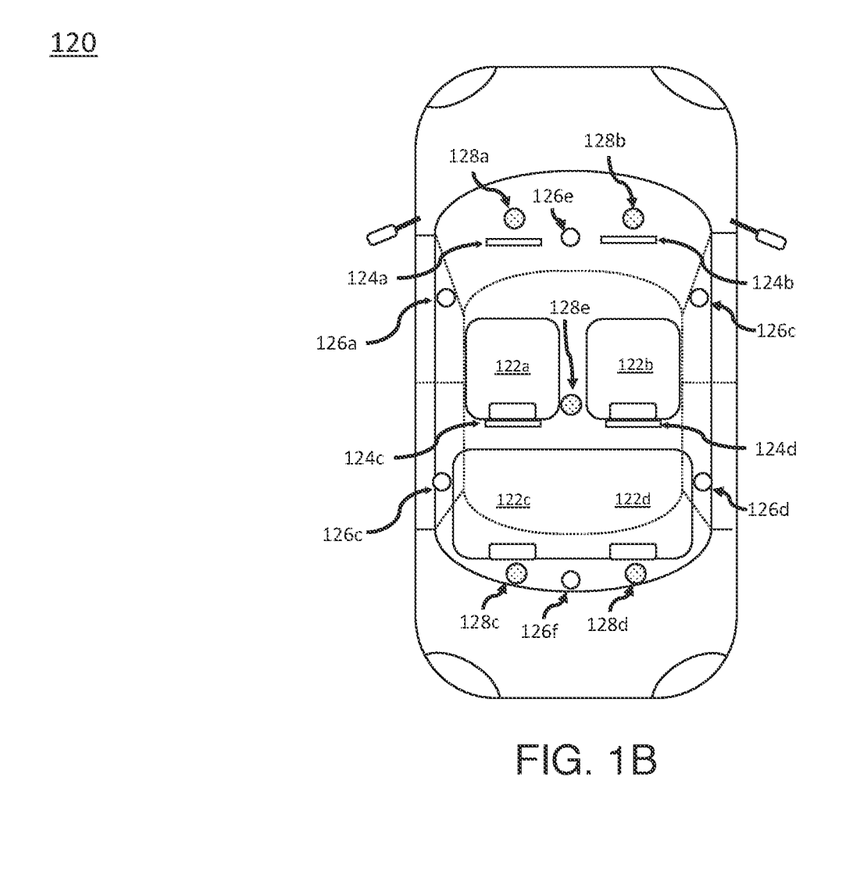

FIG. 1B shows a cutaway top view of the autonomous vehicle 110, according to various embodiments of the disclosure. As shown in FIG. 1B, there are four passenger seats 122a, 122b, 122c, 122d in the autonomous vehicle 110 arranged all facing forwards. In front of each passenger seat 122a, 122b, 122c, 122d is a screen 124a, 124b, 124c, 124d. Additionally, there are multiple microphones 126a, 126b, 126c, 126d, 126e, 126f positioned throughout the autonomous vehicle 110. The interior cabin also includes speakers 128a, 128b, 128c, 128d, 128e that can be used for making audible announcements.

In various examples, the screens 124a, 124b, 124c, 124d can be used for entertainment, virtual meetings, video conferences, to display trip information, or for any other visual display. Additionally, the screens can each include an embedded speaker for making audible announcements. In particular, a passenger sitting in the first seat 122a can view the first screen 124a, a passenger sitting in the second seat 122b can view the second screen 124b, a passenger sitting in the third seat 122c can view the third screen 124c, and a passenger sitting in the fourth seat 122d can view the fourth screen 124d. In various examples, personalized audible announcements can be played over the speakers in the screen 124a, 124b, 124c, 124d corresponding to the passenger seat 122a, 122b, 122c, 122d for the respective passenger. Similarly, personalized audible announcements for the first seat 122a can be played over the first speaker 128a, personalized audible announcements for the second seat 122b can be played over the second speaker 128b, personalized audible announcements for the third seat 122c can be played over the third speaker 128c, and personalized audible announcements for the fourth seat 122d can be played over the fourth speaker 128d. The center speaker 128e can be used for generalized audible announcements for the interior cabin.

In some examples, each screen 124a-124d is equipped with a microphone, which can be used to pick up the respective passenger's voice and to help localize detected voices to determine who is talking. In various examples, multiple interior cabin microphones 126a-126f, in addition to any microphones embedded in the screens 124a-124d can be used to identify the location of monitored conversations and determine who is talking. In some implementations, beamforming is used to which passengers are engaged in various activities (e.g., which passengers are engaged in conversation, which passenger is on a phone call, etc.) Thus, for example, the autonomous vehicle can determine that two passengers in the back seats 122c, 122d are engaged in conversation and time audible announcements for these passengers over the rear speakers 128c, 128d as described herein, while audible announcements for passengers in the front seats 122a, 122b can be based on their conversation and/or activities.

In various examples, the autonomous vehicle 110 can determine which seat each respective passenger is sitting in. That is, the autonomous vehicle 110 can determine that passenger A is sitting in the first seat 122a, passenger B is sitting in the second seat 122b, passenger C is sitting in the third seat 122c, and passenger D is sitting in the fourth seat 122d. In some examples, wireless technology such as NFC (Near Field Communication), Bluetooth, ultra wide band (UWB) technology, or inaudible sounds, can be used within the autonomous vehicle cabin to determine a passenger's mobile device location and infer passenger seat location. In some examples, an inaudible sound for mobile device location is a high frequency sound with a particular signature that is inaudible to humans but detectable by microphones. In various examples, the passenger mobile device can emit the inaudible sound and microphones in the autonomous vehicle detect the sound and determine device location. In some examples, multiple sensors are used to detect a signal and determine device location.

In some examples, computer vision can be used within the autonomous vehicle cabin to determine a passenger's seat location. In some examples, passengers are assigned a seat in the autonomous vehicle before entering the vehicle and informed of their designated seat via the ridehail application. The passenger can then confirm their seat location after entering the vehicle. In some examples, sensors determine that a passenger is sitting in a seat based on a seatbelt being buckled and/or using a seat weight sensor. In this way, audible announcements specific to a passenger can be played over speakers near that passenger's seat. Similarly, microphones near the passenger's seat can be used to identify a good time to play an audible announcement.

Figure 1C:
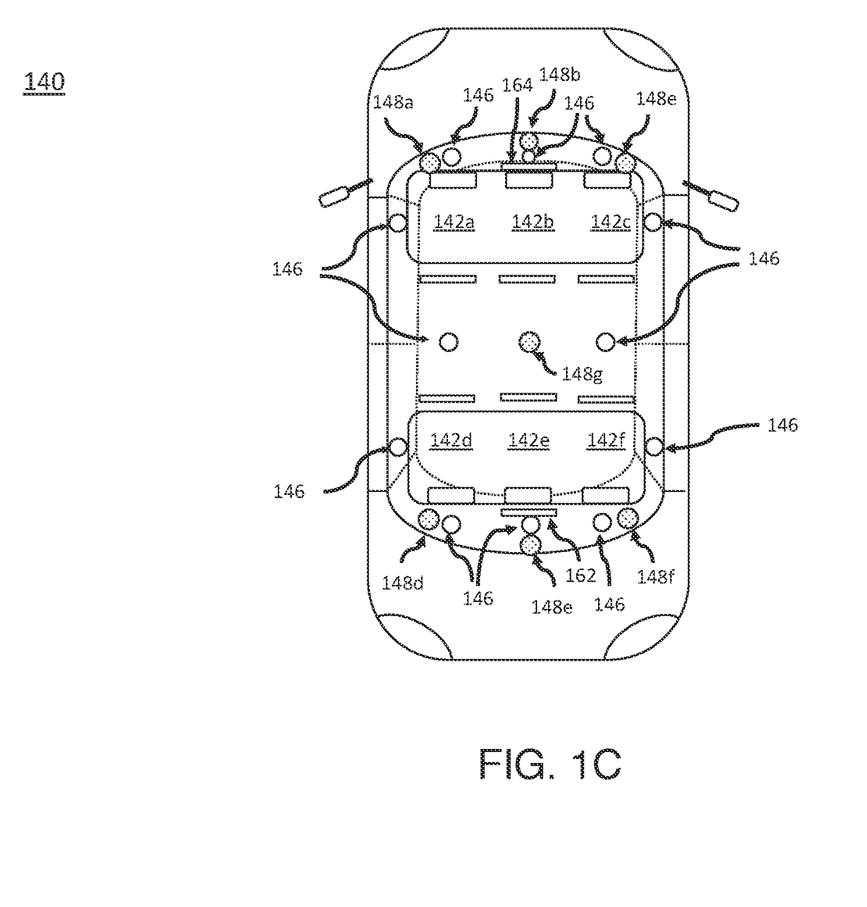

FIG. 1C shows a cutaway top view of the autonomous vehicle 110 with the interior seats facing each other, according to various embodiments of the disclosure. In particular, as shown in FIG. 1C, a first row of seats includes three seats 142a, 142b, 142c facing a first direction and a second row of seats includes three seats 144a, 144b, 144c facing the opposite direction. The autonomous vehicle cabin also includes multiple microphones 146 which can be used to monitor conversations and localize voices to various seats 142a-142f.

Additionally, the autonomous vehicle cabin includes multiple speakers 148a-148g, which can be used to play audible announcements as described herein. In particular, personalized audible announcements can be played over the speakers corresponding to the passenger seat 142a, 142b, 142c, 142d, 142e, 142f for the respective passenger. Thus, personalized audible announcements for the first seat 142a can be played over the first speaker 148a, personalized audible announcements for the second seat 142b can be played over the second speaker 148b, personalized audible announcements for the third seat 142c can be played over the third speaker 148c, personalized audible announcements for the fourth seat 142d can be played over the fourth speaker 148d, personalized audible announcements for the fifth seat 142e can be played over the fourth speaker 148e, and personalized audible announcements for the sixth seat 142f can be played over the sixth speaker 148f. The center speaker 148g can be used for generalized audible announcements for the interior cabin.

The seats 142a, 142b, 142c in the first row each face a display screen. Similarly, the seats 142d, 142e, 142f in the second row each face a display screen. Each seat 142a-142e is thus associated with a personal display screen as well as a personal speaker 148a-148e, respectively.

In various implementations, the first row of seats 142a, 142b, 142c also faces a first additional display screen 162 and the second row of seats 142d, 142e, 142f also faces a second additional display screen 164. The first 162 and second 164 additional display screens are positioned above the opposite row of seats, centered between the seats in the opposite row. In various implementations, the first 162 and second 164 additional display screens display general ride information, such as the current location on a map, the time to the next stop, and the location of the next stop. The first 162 and second 164 additional display screens may also display vehicle information such as the inside and/or outside temperature, the vehicle speed, and the vehicle license plate (or other identifying information). In some examples, additional display screens can be positioned in other places in the vehicle and can be viewable from some or all passenger seats. For example, a display screen can be positioned along the side of the vehicle cabin. Similarly, audible announcements regarding general ride information can be made over the center speaker 148g.

Example Method for Audible Announcements

Figure 2:
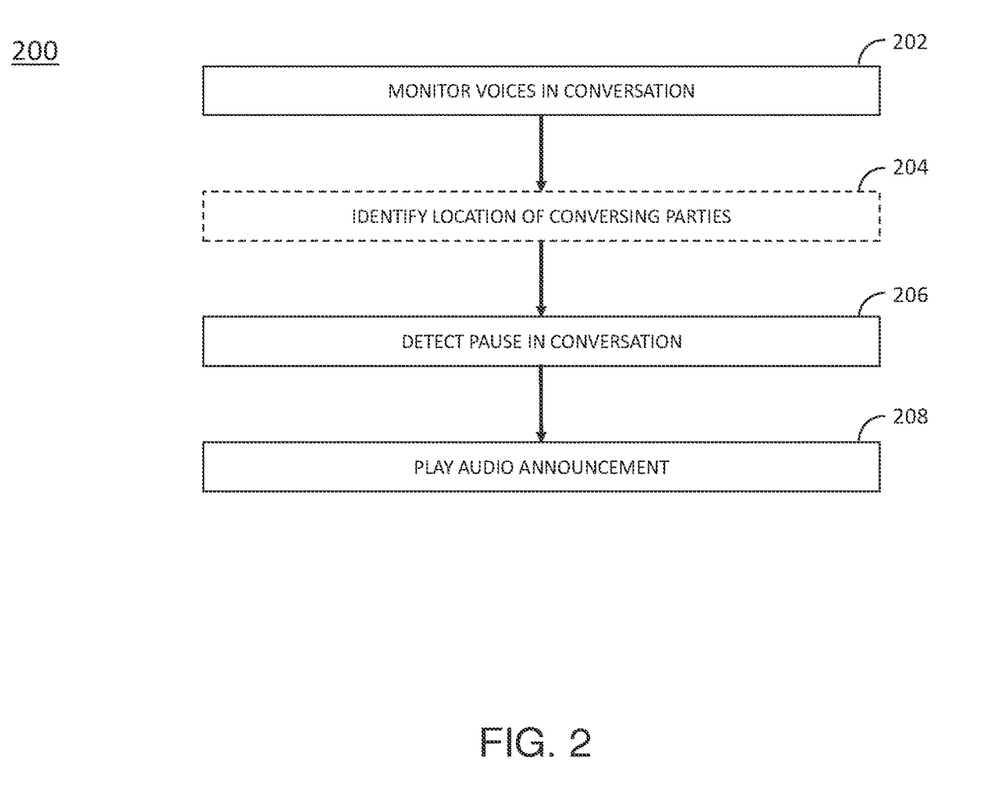
FIG. 2 is a diagram illustrating a method for audible announcements, according to some embodiments of the disclosure.

FIG. 2 is a diagram illustrating a method 200 for audible announcements, according to various embodiments of the disclosure. In particular, the method 200 is a method for identifying pauses in a conversation, such that audible announcements can be played during the pauses and/or at natural conversation breaks. In some examples, the audible announcements are played during the pauses. In various examples, the method 200 can be used for playing audible announcements from mobile device applications, such as navigation applications, as well as for playing audible announcements in vehicles or other settings.

At step 202, voices in conversation are monitored without identifying or recognizing words. In particular, microphones can be used to detect voices and monitor the conversation. The conversation can be monitored without identifying words or subject matter. For example, the conversation can be monitored for pauses, laughter, sneezes, coughs, and other types of spoken word interludes. Additionally, in some examples, the conversation can be monitored for a trigger word, wherein the trigger word activates word recognition and a system response to questions and/or commands. For instance, in an autonomous vehicle ride, the trigger word can be used to ask for a trip update or to request a cabin temperature change. In some examples, detection of a cough, sneeze, or other such sound can trigger a notification reminder to wear a mask to prevent airborne transmission of particles.

In various examples, voices are monitored by identifying sound in the frequency range of 125 hertz to 2000 hertz, which is the frequency range of human voices and vowel sounds. In some examples, voices are monitored by identifying sound in the frequency range of 125 hertz to 5000 hertz, which is the frequency range of human voices, vowel sounds, and consonant sounds. In various examples, voices can be monitored using one or more microphones in an autonomous vehicle. In some examples, voices can be monitored using a mobile device microphone.

Optionally, at step 204, the location of each of the conversing parties is identified. In particular, in an autonomous vehicle setting, the seat each conversing passenger is sitting in is identified. In some examples, interior cabin microphones can be used to identify the location of each voice. In various examples, by determining the location of the conversing passengers, audible announcements can be localized to other speakers within the autonomous vehicle while avoiding the speakers for the conversing passengers, so as not to interrupt the conversation. In particular, if there are additional passengers in the autonomous vehicle that are not engaged in conversation, audible announcements can be played through speakers for the seats of the additional passengers. For examples, referring to FIG. 1B, if passengers in seats 122c and 122d are engaged in conversation, an audible announcements may be played on the speakers 128a, 128b for passengers in the front seats 122a, 122b.

At step 206, a pause in the conversation is detected. In some examples, a pause in the conversation can be identified by a selected period of silence. For example, one second of silence can be identified as a pause in the conversation. In some examples, a pause in the conversation is identified by a selected period of time with no sounds in a selected frequency band. For example, a pause may be identified as a period of two seconds with no sounds between 125 hertz and 2000 hertz, indicating no voice or vowel sounds for two seconds. In some examples, a pause is identified as a period of two seconds with no sounds between 125 hertz and 5000 hertz, indicating no voice, vowel, or speech sounds for two seconds. In some examples, a pause is a different period of time, such as 1 second, 1.5 second, or more than 2 seconds.

In some examples, non-speech sounds are identified, such as laughter, a sneeze, a cough, or a swallow (e.g., a pause for a sip of a beverage), and the break in the spoken conversation for these types of reactions or events is detected and identified as a pause in the conversation. In some examples, one of the conversation participants may take a phone call or check a mobile device message, creating a pause in the conversation for the other participant(s). In some examples, the conversation takes place in an autonomous vehicle, and the pause in the conversation is detected by autonomous vehicle sensors. In some examples, the conversation is monitored via a mobile device and the mobile device detect the pause in the conversation.

In some implementations, a pause in the conversation is predicted based on various conversation features. For example, vocal intonation can indicate an upcoming pause, and vocal intonation can be evaluated to predict the pause. Similarly, one participant's reactions or level of interest may indicate an upcoming pause. In some examples, other sensors can be used to identify a conversation interruption, which can be used to predict an upcoming pause. For example, a conversation participant's mobile device may play an alert, likely indicating a received message, and the participant may pause the conversation to check the message. The mobile device alert can be detected by microphones or other sensors.

At step 208, an audible announcement is played. In some examples, the conversation takes place in an autonomous vehicle, and the audible announcement is played through an autonomous vehicle speaker. In some examples, the conversation is monitored using a mobile device microphone, and the audible announcement is played through a mobile device speaker.

In some implementations, in a ridehail setting with more than one party, conversations can be monitored to identify if the noise level of a conversation becomes overly loud or disruptive to others. For example, if two passengers are engaged in a loud conversation and a third passenger is attempting to read or listen to audio content, the loud conversation can be disruptive to the third passenger. In some examples, the autonomous vehicle can be configured to provide feedback to the two passengers engaged in the loud conversation to encourage them to tone it down and decrease the volume level. In some examples, the loud conversation could occur on a train, bus, or other vehicle. In some examples, the loud conversation could occur in a theater, library, or museum. Note that the noise level considered to be loud or disruptive can vary based on the setting. Nearby speakers could play a request to decrease the volume or simply make a "shh" noise.

Figure 3:
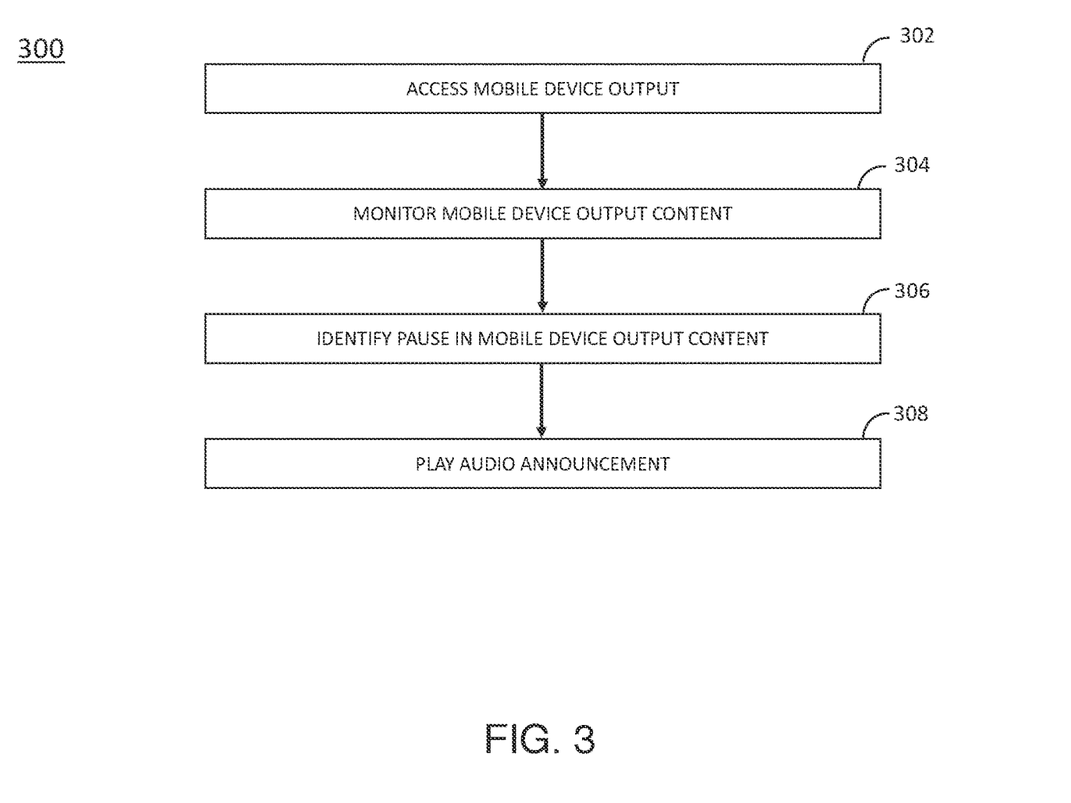
FIG. 3 is a diagram illustrating another method for audible announcements, according to some embodiments of the disclosure.

FIG. 3 is a flow chart showing a method 300 for playing an audible announcement, according to various embodiments of the disclosure. In various examples, the method 300 can be used for playing audible announcements from mobile device applications, such as navigation applications, as well as for playing audible announcements in vehicles or other settings.

At step 302, audio output from a mobile device is accessed. In some examples, the output can be accessed by an application on the mobile device. At step 304, the mobile device output content is monitored. In particular, the content of the mobile device speaker output is monitored. In some examples, the speaker output content can include output played from the mobile device, such as a podcast, audiobook, or music, and it can include a phone conversation. In some examples, the mobile device output being monitored is played through remote speakers, such as through headphones, earphones, vehicle speakers, or other remote speakers. In some examples, mobile device input content (e.g., microphone input) is also monitored to monitor a conversation as described above with respect to FIG. 2.

At step 306, a pause in the mobile device output content is identified. In some examples, a pause in the mobile device output content is a commercial break in a podcast or radio show, a chapter or section break in an audiobook, the end of a song for music, or the end of a videogame. In some examples, a pause is silence, while in other examples, the pause is identified by the change in output content type. In some examples, a pause is identified when a mobile device user ends an output content (e.g., ends a podcast, closes an audiobook) or switches from one type of output content to another type of output content. In various examples, a pause can be one second, 1.5 seconds, two seconds, or longer than two seconds.

In some implementations, a pause in the output content is predicted based on various features. For example, a podcast can have a commercial break at regular intervals. Similarly, a podcast or audiobook can play an audible indication (note, tune, etc.) indicating a break.

At step 308, an audible announcement is played. In some examples, the conversation takes place in an autonomous vehicle, and the audible announcement is played through an autonomous vehicle speaker. In some examples, the conversation is monitored using a mobile device microphone, and the audible announcement is played through a mobile device speaker.

In various implementations, in an autonomous vehicle, other vehicle sensors can be used to identify an optimal moment for an audible announcement. For example, if a passenger in an autonomous vehicle is reading a book, a camera can be used to identify a pause in the reading, such as when the passenger lifts their head to look out the window or check a video update screen. In some examples, a passenger may be viewing content on an autonomous vehicle screen, and the autonomous vehicle can monitor the screen output content. For instance, if a passenger is playing a videogame on an autonomous vehicle screen, the autonomous vehicle can detect when a game is over, or detect when the passenger is between rounds of the game, and play the audible announcement during these intervals. Similarly, if a passenger is watching a television show, the autonomous vehicle can detect commercial breaks or other pauses and play audible announcements during these breaks.

In some examples, there are multiple different types of audible announcements, and the different types of announcements can each be given a priority ranking. For example, an announcement that another passenger will be picked up in five minutes may have a low ranking, while an announcement that you will arrive at your stop in one minute may have a high ranking. In some examples, audible announcements with a low ranking are only played during pauses or breaks, as described herein, while announcements with a high ranking can be set to interrupt passengers. In some implementations, passengers can personalize audible announcements via a ridehailing application, such that audible announcements with a low ranking are not played at all. For instance, announcements with a low ranking can just appear as notifications on in-vehicle screens. In some examples, passengers can personalize audible announcement via a ridehailing application such that only audible announcements with a high ranking are played, and audible announcements are played during detected pauses or breaks. Additionally, audible announcements can be personalized based on a passenger's usual activities during a ride (e.g., reading, listening to content on headphones, in conversation on a mobile device or via an in-vehicle device, in conversation with other passengers, etc.).

Example of an Autonomous Vehicle Fleet

Figure 4:
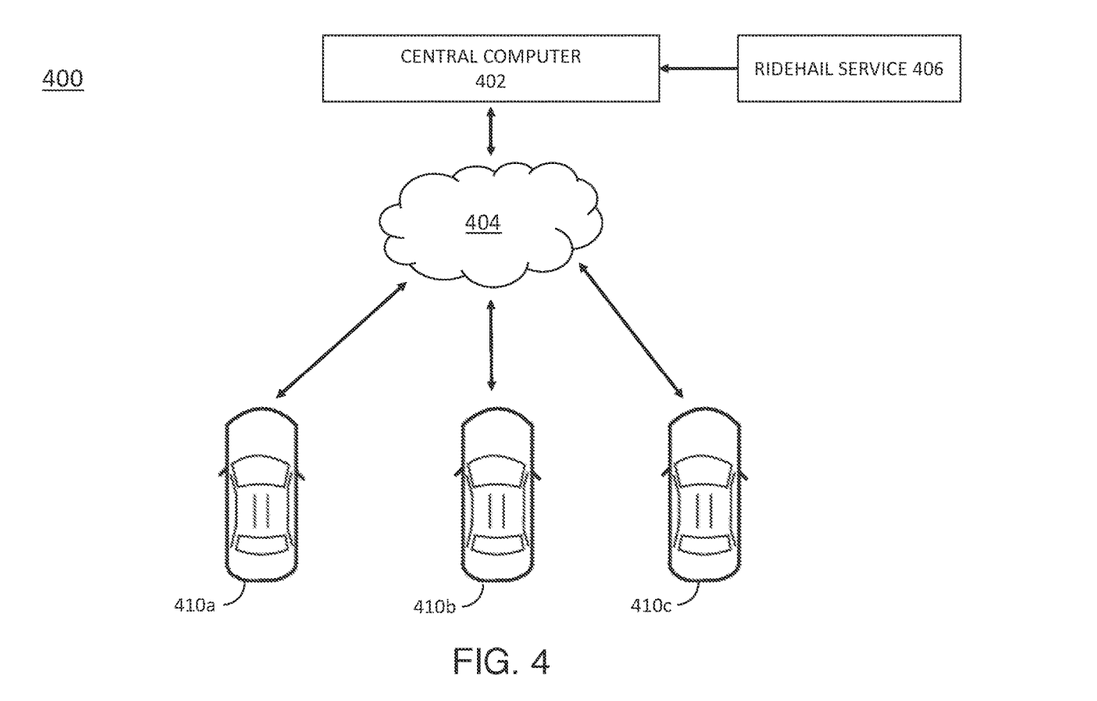
FIG. 4 is a diagram illustrating a fleet of autonomous vehicles in communication with a central computer, according to some embodiments of the disclosure.

FIG. 4 is a diagram 400 illustrating a fleet of autonomous vehicles 410a, 410b, 410c in communication with a central computer 402, according to some embodiments of the disclosure. As shown in FIG. 4, the vehicles 410a-410c communicate wirelessly with a cloud 404 and a central computer 402. The central computer 402 includes a routing coordinator and a database of information from the vehicles 410a-410c in the fleet. Autonomous vehicle fleet routing refers to the routing of multiple vehicles in a fleet. The central computer also acts as a centralized ride management system and communicates with ridehail users via a ridehail service 406. The vehicles 410a-410c can each include audible announcement technology employing the methods of FIGS. 2 and 3. In some implementations, the autonomous vehicles 410a-410c communicate directly with each other.

When a passenger requests a ride through a ridehail service 406, the ridehail service 406 sends the request to central computer 402. In various examples, a ridehail service 406 can be used to order an individual ride, to order a rideshare ride, and to order a vehicle to deliver a package. The central computer 402 selects a vehicle 410a-410c based on the request. In some examples, when the vehicle 410a-401c picks up the passenger, the passenger device is detected and a connection is established with the passenger device, as described above with respect to the method of FIG. 3. The vehicle 410a-410c continues to monitor device output content while the passenger is in the vehicle 410a-410c. The vehicles 410a, 410b, 410c communicate with a central computer 402 via a cloud 404.

Once a destination is selected and the user has ordered a vehicle, the routing coordinator can optimize the routes, for example, to optimize vehicle occupancy. In some examples, an additional passenger can be picked up en route to the destination, and the additional passenger can have a different destination. Each passenger can be individually monitored to determine whether the passenger is engaged in a conversation, focused work, or some other activity, and identify pauses for audible announcements. Audible announcements can include information about various passenger stops. Additionally, audible announcements can include information regarding a delay in arrival time for any of the passenger stops. In various implementations, since the routing coordinator has information on the routes for all the vehicles in the fleet, the routing coordinator can adjust vehicle routes, for example, to increase vehicle occupancy.

As described above, each vehicle 410a-410c in the fleet of vehicles communicates with a routing coordinator. Thus, information gathered by various autonomous vehicles 410a-410c in the fleet can be saved and used to generate information for future routing determinations. For example, sensor data can be used to generate route determination parameters. In general, the information collected from the vehicles in the fleet can be used for route generation or to modify existing routes.

According to various implementations, a set of parameters can be established that determine which metrics are considered (and to what extent) in determining routes or route modifications. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In various examples, changes to a route plan can be communicated with passengers via audible announcements using the methods of FIGS. 2 and 3.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computer 402 generates a route for each selected autonomous vehicle 410a-410c, and the routing coordinator determines a route for the autonomous vehicle 410a-410c to travel from the autonomous vehicle's current location to a destination.

Example of a Computing System for Ride Requests

Figure 5:
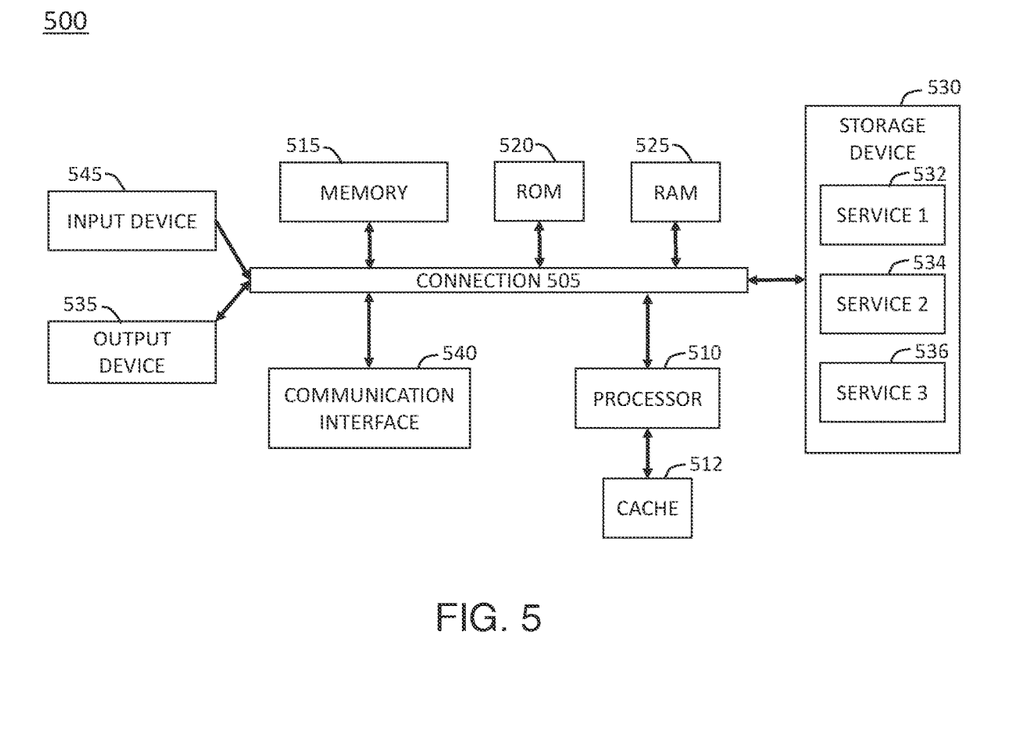
FIG. 5 shows an example embodiment of a system for implementing certain aspects of the present technology.

FIG. 5 shows an example embodiment of a computing system 500 for implementing certain aspects of the present technology. In various examples, the computing system 500 can be any computing device making up the onboard computer 104, the central computer 402, or any other computing system described herein. In some examples, the computing system 500 can be used for conversation detection and in determining when to make audible announcements in an autonomous vehicle. The computing system 500 can include any component of a computing system described herein which the components of the system are in communication with each other using connection 505. The connection 505 can be a physical connection via a bus, or a direct connection into processor 510, such as in a chipset architecture. The connection 505 can also be a virtual connection, networked connection, or logical connection.

In some implementations, the computing system 500 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 500 includes at least one processing unit (central processing unit (CPU) or processor) 510 and a connection 505 that couples various system components including system memory 515, such as read-only memory (ROM) 520 and random access memory (RAM) 525 to processor 510. The computing system 500 can include a cache of high-speed memory 512 connected directly with, in close proximity to, or integrated as part of the processor 510.

The processor 510 can include any general-purpose processor and a hardware service or software service, such as services 532, 534, and 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction, the computing system 500 includes an input device 545, which can represent any number of input mechanisms, such as a microphone for speech, a touch-sensitive screen for gesture or graphical input, keyboard, mouse, motion input, speech, etc. The computing system 500 can also include an output device 535, which can be one or more of a number of output mechanisms known to those of skill in the art. In some instances, multimodal systems can enable a user to provide multiple types of input/output to communicate with the computing system 500. The computing system 500 can include a communications interface 540, which can generally govern and manage the user input and system output. There is no restriction on operating on any particular hardware arrangement, and therefore the basic features here may easily be substituted for improved hardware or firmware arrangements as they are developed.

A storage device 530 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROM, and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as a processor 510, a connection 505, an output device 535, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an Internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for playing an audible announcement, comprising: monitoring voices in conversation, wherein monitoring voices includes detecting voice and speech sounds; identifying a pause in the conversation, wherein the pause includes a selected period of time with no detected voice sounds; and causing an audio device to output the audible announcement during the pause.

Example 2 provides a method according to one or more of the preceding and/or following examples, wherein monitoring voices further comprises detecting sound in a select frequency band, wherein the select frequency band corresponds to voice and speech frequencies.

Example 3 provides a method according to one or more of the preceding and/or following examples, wherein detecting sound in the select frequency band includes detecting sound having frequencies between 100 hertz and 2000 hertz.

Example 4 provides a method according to one or more of the preceding and/or following examples, wherein detecting sound in the select frequency band includes detecting sound having frequencies between 100 hertz and 5000 hertz.

Example 5 provides a method according to one or more of the preceding and/or following examples, wherein identifying the pause includes identifying about two seconds with no detected voice sounds.

Example 6 provides a method according to one or more of the preceding and/or following examples, further comprising predicting the pause in the conversation based on detected voice and speech sounds Example 7 provides a method according to one or more of the preceding and/or following examples, wherein monitoring voices includes monitoring voices using a microphone in an autonomous vehicle, and wherein causing the audio device to output the audible announcement includes playing the audible announcement on an autonomous vehicle speaker.

Example 8 provides a method according to one or more of the preceding and/or following examples, wherein monitoring voices includes monitoring voices using a mobile device microphone, and wherein causing the audio device to output the audible announcement includes playing the audible announcement on a mobile device speaker.

Example 9 provides a method for playing an audible announcement, comprising: accessing mobile device speaker output; monitoring mobile device output content; identifying a pause in the mobile device output content; and causing an audio device to output the audible announcement during the pause.

Example 10 provides a method according to one or more of the preceding and/or following examples, wherein monitoring the mobile device output content includes monitoring one of a podcast, an audiobook, and music.

Example 11 provides a method according to one or more of the preceding and/or following examples, wherein identifying the pause includes identifying one of a podcast commercial break, an audiobook chapter break, a transition between programs, and a transition between songs.

Example 12 provides a method according to one or more of the preceding and/or following examples, wherein monitoring the mobile device output content includes monitoring a mobile device phone conversation, and wherein identifying the pause includes identifying a conversation pause.

Example 13 provides a method according to one or more of the preceding and/or following examples, wherein monitoring the mobile device output content further comprises detecting sound in a select frequency band, wherein the select frequency band corresponds to voice and speech frequencies.

Example 14 provides a method according to one or more of the preceding and/or following examples, further comprising predicting the pause in the mobile device output content based on output content type and corresponding pause types.

Example 15 provides a system for playing an audible announcement, comprising: a microphone to monitor voices in conversation and detect voice and speech sounds; a processor to identify a pause in the conversation, wherein the pause includes a selected period of time with no detected voice sounds or speech sounds; and a speaker to play the audible announcement during the pause.

Example 16 provides a system according to one or more of the preceding and/or following examples, wherein the microphone is further to detect sound in a select frequency band, wherein the select frequency band corresponds to voice and speech frequencies.

Example 17 provides a system according to one or more of the preceding and/or following examples, wherein the select frequency band includes frequencies between 100 hertz and 2000 hertz.

Example 18 provides a system according to one or more of the preceding and/or following examples, wherein the selected period of time for the pause is about two seconds.

Example 19 provides a system according to one or more of the preceding and/or following examples, wherein the processor is further to predict the pause in the conversation based on detected voice and speech sounds.

Example 20 provides a system according to one or more of the preceding and/or following examples, further comprising an autonomous vehicle, wherein the microphone and speaker are inside an interior cabin of the autonomous vehicle and the processor is in an onboard computer in the autonomous vehicle; wherein the microphone is to monitor voices in the autonomous vehicle; and wherein the speaker is to play the audible announcement inside the autonomous vehicle.

Example 21 provides a system according to one or more of the preceding and/or following examples, further comprising a mobile device, wherein the microphone, processor, and speaker are in the mobile device.

Example 22 provides a method for playing an audible announcement, comprising: monitoring voices in conversation, wherein monitoring voices includes detecting voice sounds; identifying a pause in the conversation, wherein the pause includes a selected period of time with no detected voice sounds; and causing an audio device to output the audible announcement during the pause.

Example 23 provides a method for playing an audible announcement, comprising: monitoring voices in conversation, wherein monitoring voices includes detecting speech sounds; identifying a pause in the conversation, wherein the pause includes a selected period of time with no detected speech sounds; and causing an audio device to output the audible announcement during the pause.

Example 24 provides a method according to one or more of the preceding and/or following examples, wherein causing the audio device to output the audible announcement includes causing a speaker to play the audible announcement.

Example 25 provides a method according to one or more of the preceding and/or following examples, wherein the speaker is an autonomous vehicle speaker.

Example 26 provides a method according to one or more of the preceding and/or following examples, wherein causing the audio device to output the audible announcement includes causing a mobile device to output the audible announcement.

Example 27 provides a system for playing an audible announcement, comprising: a microphone configured to monitor voices in conversation and detect voice and speech sounds; a processor to identify a pause in the conversation, wherein the pause includes a selected period of time with no detected voice sounds or speech sounds, and to cause an audio device to output the audible announcement during the pause.

VARIATIONS AND IMPLEMENTATIONS

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for playing an audible announcement in a vehicle with an interior cabin, at least one interior cabin microphone, at least one first audio device, and at least one second audio device, comprising:
monitoring voices in conversation, via the at least one interior cabin microphone, wherein monitoring voices includes detecting voice and speech sounds and mobile device speaker output of a mobile device;
determining, via the vehicle, one or more conversing passengers engaged in the conversation by monitoring mobile device output content;
identifying, via the vehicle, a location within the interior cabin for each conversing passenger based on a location for a mobile device associated with each conversing passenger, wherein each location is associated with the at least one first audio device;
causing the at least one second audio device to output the audible announcement while avoiding causing the at least one first audio device to output the audible announcement based on the mobile device output content;
identifying a pause in the conversation based on the mobile device output content, wherein the pause includes a selected period of time with no detected voice sounds; and
causing the at least one first audio device to output the audible announcement during the pause.

2. The method of claim 1, wherein monitoring voices further comprises detecting sound in a select frequency band, wherein the select frequency band corresponds to at least one of voice frequencies and speech frequencies.

3. The method of claim 2, wherein detecting sound in the select frequency band includes detecting sound having frequencies between 100 hertz and 2000 hertz.

4. The method of claim 1, wherein identifying the pause includes identifying about two seconds with no detected voice sounds.

5. The method of claim 1, further comprising predicting the pause in the conversation based on detected voice and speech sounds.

6. The method of claim 1, wherein the location for each conversing passenger is a seat location within the interior cabin, the seat being associated with the at least one first audio device.

7. The method of claim 6, wherein the seat location is determined by the vehicle using computer vision.

8. A method for playing an audible announcement in a vehicle in communication with a mobile device, comprising:
accessing mobile device speaker output;
determining a location of the mobile device within a cabin of the vehicle;
identifying a first audio device of the vehicle based on the location of the mobile device;
monitoring mobile device output content;
causing a second audio device of the vehicle to output the audible announcement while avoiding causing the first audio device to output the audible announcement based on the mobile device output content;
identifying a pause in the mobile device output content; and
causing the first audio device to output the audible announcement during the pause.

9. The method of claim 8, wherein monitoring the mobile device output content includes monitoring one of a podcast, an audiobook, and music.

10. The method of claim 9, wherein identifying the pause includes identifying one of a podcast commercial break, an audiobook chapter break, a transition between programs, and a transition between songs.

11. The method of claim 8, wherein monitoring the mobile device output content includes monitoring a mobile device phone conversation, and wherein identifying the pause includes identifying a conversation pause.

12. The method of claim 11, wherein monitoring the mobile device output content further comprises detecting sound in a select frequency band, wherein the select frequency band corresponds to at least one of voice and speech frequencies.

13. The method of claim 8, further comprising predicting the pause in the mobile device output content based on output content type and corresponding pause types.

14. A system for playing an audible announcement, comprising:
a vehicle in communication with a mobile device, the vehicle having:
   a microphone to monitor voices in conversation and detect voice and speech sounds;
   at least one first speaker corresponding to at least one conversing passenger;
   at least one second speaker corresponding to at least one non-conversing passenger;
   a processor to:
      access mobile device speaker output;
      determine a location of the mobile device within an interior cabin of the vehicle;
      identify the at least one first speaker based on the location of the mobile device;
      monitoring mobile device output content;
      cause the at least one second speaker to play the audible announcement while avoiding causing the at least one first speaker to output the audible announcement based on the mobile device output content;
      identify a pause in the conversation based on the mobile device output content, wherein the pause includes a selected period of time with no detected voice sounds or speech sounds; and
      cause the at least one first speaker to play the audible announcement during the pause.

15. The system of claim 14, wherein the microphone is further to detect sound in a select frequency band, wherein the select frequency band corresponds to voice and speech frequencies.

16. The system of claim 15, wherein the select frequency band includes frequencies between 100 hertz and 2000 hertz.

17. The system of claim 14, wherein the selected period of time for the pause is about two seconds.

18. The system of claim 14, wherein the processor is further to predict the pause in the conversation based on detected voice and speech sounds.

19. The system of claim 14, wherein the vehicle is an autonomous vehicle,
wherein the microphone and speaker are inside the interior cabin of the autonomous vehicle and the processor is in an onboard computer in the autonomous vehicle;
wherein the microphone is to monitor voices in the autonomous vehicle; and
wherein the first and second speakers are to play the audible announcement inside the autonomous vehicle.

20. The system of claim 14, wherein the mobile device emits an inaudible sound and the microphone of the vehicle detects the inaudible sound, the processor of the vehicle further identifies that the at least one first speaker corresponds to the at least one conversing passenger using the detected inaudible sound.

* * * * *